(12) United States Patent
Chen et al.

(10) Patent No.: US 6,760,113 B2
(45) Date of Patent: Jul. 6, 2004

(54) CRYSTAL BASED FRINGE GENERATOR SYSTEM

(75) Inventors: Fang Frank Chen, Rochster Hills, MI (US); James Stewart Rankin, II, Novi, MI (US); Mumin Song, Ann Arbor, MI (US); Paul Joseph Stewart, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/812,402

(22) Filed: Mar. 20, 2001

(65) Prior Publication Data

US 2002/0135773 A1 Sep. 26, 2002

(51) Int. Cl.⁷ .................................................. G01B 9/02
(52) U.S. Cl. ...................................... 356/492; 356/495
(58) Field of Search ............................... 356/603, 604, 356/605, 491–495

(56) References Cited

U.S. PATENT DOCUMENTS

| | | | |
|---|---|---|---|
| 4,343,019 A | | 8/1982 | Lagoni |
| 4,641,972 A | * | 2/1987 | Halioua et al. ............. 356/376 |
| 4,906,099 A | | 3/1990 | Casasent |
| 4,984,893 A | * | 1/1991 | Lange ......................... 356/376 |
| 5,175,601 A | | 12/1992 | Fitts |
| 5,319,445 A | | 6/1994 | Fitts |
| 5,434,669 A | | 7/1995 | Tabata et al. |
| 5,450,204 A | | 9/1995 | Shigeyama et al. |
| 5,471,308 A | | 11/1995 | Zeien |
| 5,581,352 A | * | 12/1996 | Zeien ......................... 356/604 |
| 5,589,942 A | | 12/1996 | Gordon |
| 5,691,784 A | | 11/1997 | Häusler et al. |
| 5,825,482 A | | 10/1998 | Nikoonahad |
| 5,973,784 A | * | 10/1999 | Szwaykowski et al. ..... 356/495 |

FOREIGN PATENT DOCUMENTS

| | | |
|---|---|---|
| DE | 41 30 237 A | 3/1993 |
| EP | 0 082 830 A2 | 12/1982 |
| EP | 0 453 977 A2 | 10/1991 |
| FR | 2 682 473 A | 4/1993 |
| JP | 2000146534 | 5/2000 |
| WO | WO 89/09378 | 10/1989 |

OTHER PUBLICATIONS

Docchio, F. and Sansoni, G., Acts of the II Congress "Metrology and Quality" (Feb. 2001) Engineering Department, University of Brescia.

Huntley, J. and Saldner, H., "Error–reduction Methods for Shape Measurement by Temporal Phase Unwrapping", J. Opt. Soc. Am. A/vol. 14, No. 12/Dec. 1997.

Coggrave, C. and Huntley, J., High–speed Surface Profilometer Based On A Spatial Light Modulator And Pipeline Image Processor, Opt. Eng. 38(9) 1573–1581 (Sep. 1999), Loughborough University, United Kingdom.

* cited by examiner

*Primary Examiner*—Stephone B. Allen
(74) *Attorney, Agent, or Firm*—Raymond L. Coppiellie; Artz & Artz

(57) ABSTRACT

A measurement system (10) for accurately measuring the surface geometry of a part (32) in three dimensions includes a laser (12) for emitting a laser beam (14). The laser beam (14) is transmitted to a birefringent crystal (16) which splits the laser beam (14) into a pair of beams (18,20). The pair of beams (18,20) are then subjected to a phase shift by a liquid crystal system (24) as controlled by a computer (26). The pair of beams (18,20) are then expanded in order to form a fringe pattern (30) on the surface of the part (32) to be measured.

15 Claims, 1 Drawing Sheet

CRYSTAL BASED FRINGE GENERATOR SYSTEM

TECHNICAL FIELD

The present invention relates generally to an optical three-dimensional measurement system. More particularly, the present invention relates to a non-contact optical three dimensional measurement system using a laser structured light generator.

BACKGROUND ART

Many current systems exist for measuring the geometry of three-dimensional surfaces. One such system is a coordinate measurement system (CMM) which is used to measure die stamps, stamped panels, and other vehicle body structures.

The current CMM systems suffer from a variety of disadvantages. First, these CMM systems are relatively slow which limits the number of measurements that they can take during any given period of time. Second, these CMM systems require surface contact in order, to function properly, which can potentially damage the surface of the part being measured. Additionally, depending upon the geometry of the surface being measured, an instrument that needs to contact the surface to perform measuring risks damage due to contact with the surface as it moves to various surface points. These CMM systems are thus typically only used in connection with small-scale projects, which makes them relatively inefficient.

Additionally, current measurement systems typically have a variety of mechanically moving parts. These moving parts can cause vibrations in the system, which can affect the accuracy of the measurements. In order to reduce the inaccuracy and/or unreliability in the measurements of the systems that utilize mechanically moving parts, the system has to allow time for the vibration to settle before the measurements are taken. This, however, adds to the time of the process and therefore increases the cost. These systems also have limitations in data acquisition speed, size, and reliability.

U.S. Pat. No. 6,100,984, discloses a system that solves many of the above-noted problems and improves on prior measurement systems. The disclosed measurement system of the '984 patent includes a laser which emits a beam through an objective lens, which expands the laser beam into a diverged beam. The diverged beam passes through a liquid crystal system that is located forwardly of the objective lens with respect to the laser. The liquid crystal system receives the diverged beam and generates at least one fringe pattern on a surface of a part to be measured. The liquid crystal system is in communication with a computer to control the pitch and phase of the fringe pattern.

While the system disclosed in U.S. Pat. No. 6,100,984 has been found to be extremely effective, it would be advantageous if a measurement system could be developed for measuring part surfaces or other surface geometry that was more compact, more accurate, and more efficient.

SUMMARY OF THE INVENTION

It is therefore an object of the present invention to provide a non-contact optical based three dimensional measurement system that is light in weight, compact, and accurate.

It is another object of the present invention to provide a non-contact optical based three dimensional measurement system that has high data acquisition speeds.

It is a further object of the present invention to provide a three dimensional measurement system that can decrease the cost of die development and vehicle body design.

It is still a further object of the present invention to provide a three dimensional measurement system that is insensitive to environmental vibration.

In accordance with the objects of the present invention, a measurement system for measuring the surface geometry of parts in three dimensions is provided. The measurement system includes a laser for emitting a laser beam. The laser beam is first passed through a birefringement crystal which splits the beam into two beams. The split beam then passes from the crystal to a liquid crystal system, which is in communication with a computer system. The diverged beam is then passed to a laser beam expander which expands the two laser beams and allows them to overlap or superimpose in the space to interface with each other to form fringe patterns on the surface to be measured. A camera, sensor, or other photographic equipment is positioned to take an image of or analyze the fringe pattern on the surface. Thereafter, the computer and the liquid crystal system perform a phase shift on the fringe pattern and then take another picture of another image.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Refer now to FIGS. 1 through 4, which illustrate various embodiments of a light source 10 of a measurement system in accordance with the present invention. The disclosed measurement system is a non-contact optical three-dimensional measurement system for measuring the three dimensional geometry of various surfaces, including dies, stamping panels, vehicle body structures, as well as a variety of other structures in both automotive and non-automotive applications. The light source 10 generates a grid or other pattern on the surface to be measured.

Figure 1:
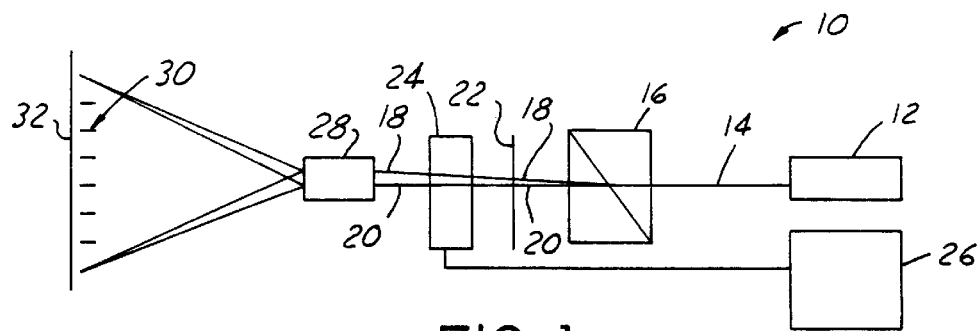
FIG. 1 is a schematic illustration of a liquid crystal polarization and birefringent crystal based fringe generation in accordance with a preferred embodiment of the present invention.

With reference to FIG. 1, the light source 10 includes a laser 12, which emits a laser beam, generally indicated by reference number 14. The laser beam 14 is directed to a birefringent crystal 16. While a birefringent crystal is preferably utilized, any transparent light divider, such as a prism may be utilized. The birefringent crystal 16 splits the laser beam 14 into two separate beams, generally indicated by reference numbers 18, 20. It should be understood that the beams 14 may be divided or subdivided into more beams as desired. The separate beams 18, 20 are then preferably passed to a circular polarizer 22, which is used to equalize the intensity of the two beams 18, 20. While a circular polarizer 22 is preferably utilized, a variety of other polarizers or similar structures may be utilized for accomplishing this objective. Further, the laser may be any commercially available laser.

The two beams 18, 20 are passed from the circular polarizer 22 to a liquid crystal system 24. The liquid crystal system 24 is in communication with and controlled by a computer system 26, in order to perform phase shifting, as is known. The liquid crystal system 24 is preferably a polarization-based phase shifter. After the beams 18, 20 pass through the liquid crystal system 24, they are directed to a laser beam expander 28 which expends the two laser beams 18, 20 and allows them to overlap or superimpose in the space to interfere with each other to form a fringe pattern or line array 30 on the surface 32 of the part to be measured.

Figure 2:
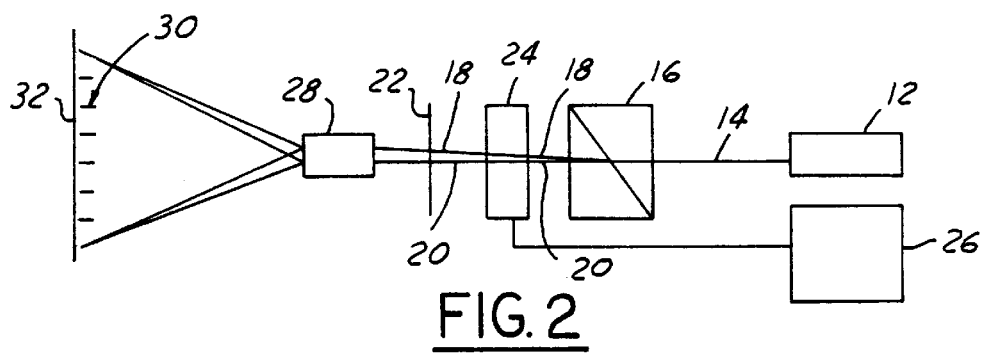
FIG. 2 is a schematic illustration of a liquid crystal retardation and birefringent crystal based fringe generator in accordance with a preferred embodiment of the present invention.

FIG. 2 illustrates an alternative embodiment of the light source 10 for the measurement system. In FIG. 2, the system operates the same as the system shown in FIG. 1, except as described below. As shown in FIG. 2, the beams 18, 20 exit the birefringent crystal 16 and enter the liquid crystal system 24. In this embodiment, the liquid crystal system 24 is a crystal-based phase retardation phase shifter, which is controlled by the computer system 26 to perform phase shifting. After the beams 18, 20 exit the liquid crystal system 24, they enter the polarizer 22, which in this embodiment orients the polarization directions of the two beams 18, 20 into the same orientation or direction. The beams 18, 20 then enter the beam expander 28, which projects them on the part 32 in the form of a fringe pattern 30. Again, while a polarizer is preferably utilized, a variety of other known structures may also be utilized for accomplishing the described function.

Figure 3:
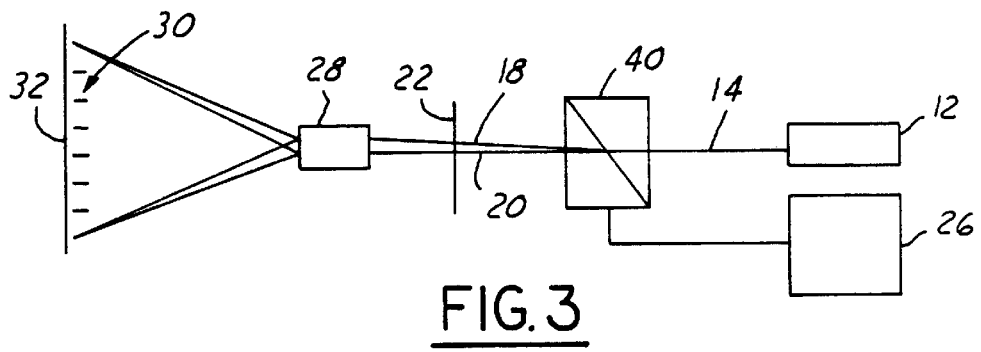
FIG. 3 is a schematic illustration of a liquid crystal retardation based fringe generator in accordance with a preferred embodiment of the present invention.

FIG. 3 illustrates an alternative embodiment of the light source 10 for the measurement system. In this embodiment, a laser 12 emits a laser beam 14, which is directed to a liquid crystal system 40. In this embodiment, the liquid crystal system 40 is preferably a liquid crystal retardation-based phase shifter. The liquid crystal system 40 is preferably a combination of a liquid crystal system 24 and a birefringent crystal 16, as described above. The liquid crystal system 40 can be formed by gluing or otherwise securing the liquid crystal system 24 to the birefringent crystal 16. Alternatively, the liquid crystal system 40 can be formed by combining these structures into a single structure during manufacture. The liquid crystal system 40 thus splits the laser beam 14 into two separate beams 18, 20, and is controlled by the computer system 26 to effectuate the beam splitting and phase shifting in a single structure.

The beams 18, 20 that exit the liquid crystal system 40 then pass through the polarizer 22, which orients the polarization directions of the two beams 18, 20, into the same orientation or direction. The properly oriented beams then pass to the laser beam expander 28 which expands the two beams 18, 20 and allows them to overlap or superimpose in the space and interfere with each other to form a fringe pattern or line array 30 on the surface 32 of the part to be measured. This embodiment results in a more compact system allowing for smaller packaging requirements. Further, the beams, in this embodiment only, pass through a single structure, which minimizes the potential for diminished light intensity. Further, the single structure also eliminates any alignment problems that may be present in the above described embodiments, which utilize multiple structures.

Figure 4:
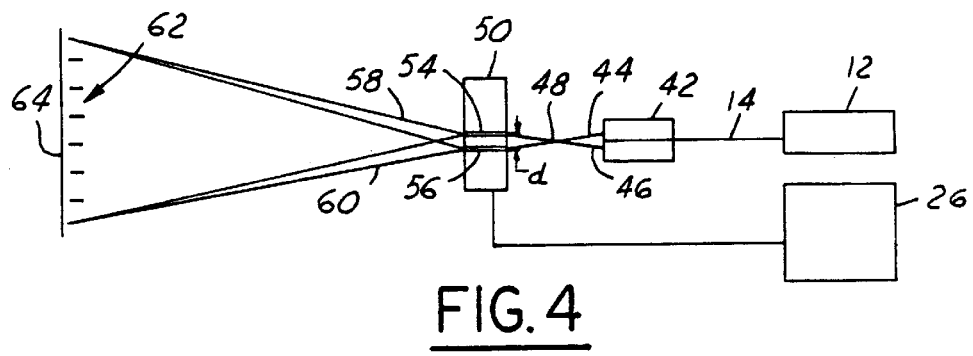
FIG. 4 is a schematic illustration of a liquid crystal two-source fringe generator in accordance with a preferred embodiment of the present invention.

FIG. 4 illustrates an alternative embodiment of the light source 10 for use with the measurement system. As shown in FIG. 4, a laser 12 emits a laser beam 14, which is directed to a beam expander 42. The beam expander 42 expands the beam 14 into multiple beams 44, 46, which converge and intersect at a point 48 before entering a liquid crystal system 50. The beam expander 42 thus illuminates the liquid crystal system 50. In this embodiment, the liquid crystal system 50 is a spatial light modulator system having two slots, 54, 56, or a two circular hole pattern. The liquid crystal system 50 is in communication with a computer system 26, which performs phase shifting on the beams 44, 46. The number of slots or holes may obviously be varied by the computer system 26. Additionally, the distance d between the holes or slots may be varied by the computer system 52. The liquid crystal system 50 emits two beams 58, 60, which will interfere in space to generate a fringe pattern 62 on a part surface 64 to be measured.

After the fringe pattern 30 is projected onto the part surface 32, an image is formed that includes the fringe pattern and the part surface being measured. The image formation on the part surface 32 preferably employs a diffraction effect, as is well known in the art, so that the fringe pattern exists in space and effectively eliminates any defocus problem. Other known image formation techniques may be utilized. Multiple fringe patterns are preferably formed on the surface of the part 32 to be measured. In the preferred embodiment, three fringe patterns are generated on the part surface in order to ensure accurate measurement of the part surface geometry. However, it should be understood that four or more patterns may be generated.

After the first image has been formed, a camera or other photographic device (not shown) takes a picture of the image (comprised of the fringe pattern on the part surface). Thereafter, the computer 26 signals the liquid crystal system 24 in order to phase shift the fringe pattern, as is well known in the art. The phase shifting assists in the accurate measurement of the part surface 32. Thereafter, another photograph is taken of this subsequent image resulting from the phase shift. Phase shifting is then preferably performed again in order to generate a third image. A photograph is then taken of this third image. This process is preferably performed three times. However, it may be performed more or less times in accordance with the present invention.

While particular embodiments of the invention have been shown and described, numerous variations and alternate embodiments will occur to those skilled in the art. Accordingly, it is intended that the invention be limited only in terms of the appended claims.

What is claimed is:

1. A fringe generator for use in connection with a measurement system for measuring surface part geometry, comprising:

a laser for emitting a laser beam;

a transparent device disposed forwardly of said laser for splitting said laser beam into a plurality of beams;

a liquid crystal system disposed forwardly of said transparent device;

a polarizer disposed between said liquid crystal system and said transparent device;

a computer in communication with said liquid crystal system and said polarizer to perform phase shifting on said plurality of beams; and a beam expander for expanding said plurality of beams to form a fringe pattern on the part;

wherein said liquid crystal system is a liquid crystal polarization based phase shifter.

2. The measurement system of claim 1, further comprising:
- a polarizer which is disposed between said transparent device and said liquid crystal system.

3. A measurement system of claim 1, wherein said transparent device and said liquid crystal system are combined into a single structure.

4. The measurement system of claim 1, wherein said liquid crystal system is a spatial light modulator.

5. The measurement system of claim 1, wherein the part having its surface measured is a vehicle body part.

6. The measurement system of claim 1, wherein said transparent device is a birefringent crystal.

7. A method for generating a fringe on a part surface, which is to be measured, comprising:
- emitting a single beam from a laser;
- splitting said single beam into a plurality of beams;
- phase shifting said plurality of beams at a stationary computer controlled liquid crystal system with a computer controlled polarizer; and
- expanding said plurality of beams such that they overlap in space to interfere with each other to form a fringe pattern on the surface of the part.

8. The method of claim 7, wherein said phase shifting is controlled by a computer system.

9. The method of claim 7, wherein said splitting and said phase shifting are performed by a single structure.

10. The method of claim 7, further comprising:
- orienting the polarization directions of each of said plurality of beams in the same direction.

11. The method of claim 10, wherein said orienting is performed before said phase shifting of said plurality of beams.

12. The method of claim 10, wherein said orienting is performed after said phase shifting of said pair of beams.

13. A fringe generator for a measurement system for accurately measuring the surface geometry of a part, the fringe generator comprising:
- a laser device for emitting a laser beam;
- a birefringent crystal located so as to receive said laser beam and for splitting said laser beam into a plurality of beams;
- a liquid crystal system disposed forwardly of said birefringent crystal and in communication with a computer for controlling phase shifting of said plurality of beams; and
- a polarizer for orienting the polarization directions of said plurality of beams in the same direction wherein said polarizer is located between said birefringent crystal and said liquid crystal system.

14. The system of claim 13, further comprising: a beam expander for expanding said plurality of laser beams to form at least one fringe pattern.

15. The system of claim 13, wherein said birefringent crystal is in communication with said computer to perform said phase shifting.

* * * * *